US011128880B1

(12) United States Patent
Kim et al.

(10) Patent No.: US 11,128,880 B1
(45) Date of Patent: Sep. 21, 2021

(54) METHOD AND SERVER FOR RECOGNIZING AND DETERMINING OBJECT IN IMAGE

(71) Applicant: doinglab Corp., Seoul (KR)

(72) Inventors: Jae Yeol Kim, Seoul (KR); Dae Han Kim, Seoul (KR); Hyun Suk Lee, Hwaseong-si (KR)

(73) Assignee: doinglab Corp., Seoul (KR)

( * ) Notice: Subject to any disclaimer, the term of this patent is extended or adjusted under 35 U.S.C. 154(b) by 0 days.

(21) Appl. No.: 17/190,140

(22) Filed: Mar. 2, 2021

(30) Foreign Application Priority Data

Dec. 16, 2020 (KR) ........................ 10-2020-0175972

(51) Int. Cl.
*H04N 19/507* (2014.01)
(52) U.S. Cl.
CPC .................................. *H04N 19/507* (2014.11)
(58) Field of Classification Search
CPC .................................................... H04N 19/507
USPC .................................................... 375/240.12
See application file for complete search history.

(56) References Cited

U.S. PATENT DOCUMENTS

| 2021/0023715 | A1* | 1/2021 | Zhang | .................... | B25J 9/1697 |
| 2021/0120248 | A1* | 4/2021 | Chong | ................ | H04N 19/176 |

FOREIGN PATENT DOCUMENTS

| KR | 10-1607224 B1 | 3/2016 |
| KR | 102185777 B1 | 12/2020 |

OTHER PUBLICATIONS

X. Cao et al., "Spectral-Spatial Hyperspectral Image Classification Using Cascaded Markov Random Fields", IEEE Journal of Selected Topics in Applied Earth Observations and Remote Sensing, vol. 12, No. 12, Sep. 12, 2019, pp. 4861-4872, IEEE, ISSN: 1939-1404.
An Office Action mailed by the Korean Intellectual Property Office dated Feb. 15, 2021, which corresponds to Korean Patent Application 10-2020-0175972 and is related to U.S. Appl. No. 17/190,140.

\* cited by examiner

*Primary Examiner* — Allen C Wong
(74) *Attorney, Agent, or Firm* — Studebaker & Brackett PC

(57) ABSTRACT

A method in which a server recognizes and determines an object in an image may include calculating a feature map including an object feature point within the image by learning the image based on a first model, calculating compression feature information by compressing the feature map based on a first filter, inputting the compression feature information for each at least one layer and calculating respective prediction information by learning the compression feature information for each layer based on a second model, and calculating prediction result information by determining whether the respective prediction information sequentially exceeds a predetermined threshold value in order from a top layer.

13 Claims, 8 Drawing Sheets

METHOD AND SERVER FOR RECOGNIZING AND DETERMINING OBJECT IN IMAGE

CROSS-REFERENCE TO RELATED APPLICATIONS

A claim for priority under 35 U.S.C. § 119 is made to Korean Patent Application No. 10-2020-0175972 filed on Dec. 16, 2020 in the Korean Intellectual Property Office, the entire contents of which are hereby incorporated by reference.

BACKGROUND

Embodiments of the inventive concept described herein relate to a method of determining an object in an image, and more particularly, relate to a method and a server that recognize an object in an image and determine the recognized object.

Nowadays, a technology for recognizing an object in an image has been widely used. In particular, the technology may mainly use a learned convolutional neural network (CNN).

In a general CNN structure, only K classes that have finally declared may be predicted. A new class that is not present may be predicted as another class having a similar feature to the new class. That is, a class that is completely different in the human sense may be predicted because the general CNN structure is based on only the priority of a feature.

For example, there are many combinations capable of being generated in a case of food. However, when the food having the corresponding combination is not defined as a class, the food may not be recognized or may be predicted as completely-different food. The artificial intelligence (AI) in the general CNN structure tends to overfit learned data, and tends not to recognize an unlearned layer.

Accordingly, there is a need for a method of deriving a high-accurate result of predicting an unlearned class or incorrectly-recognized class, not a completely-wrong prediction result.

There is a prior art disclosed as Korean Registered Patent Publication No. 10-2185777.

SUMMARY

Embodiments of the inventive concept provide a prediction result depending on a pre-stored hierarchical structure for each object in an image.

Moreover, embodiments of the inventive concept provide a method of using one network to predict an object in an image by dividing the object for each at least one layer.

The technical problems to be solved by the present inventive concept are not limited to the aforementioned problems, and any other technical problems not mentioned herein will be clearly understood from the following description by those skilled in the art to which the inventive concept pertains.

According to an embodiment, a method in which a server recognizes and determines an object in an image includes calculating a feature map including an object feature point within the image by learning the image based on a first model, calculating compression feature information by compressing the feature map based on a first filter, inputting the compression feature information for each at least one layer and calculating respective prediction information by learning the compression feature information for each layer based on a second model, and calculating prediction result information by determining whether the respective prediction information sequentially exceeds a predetermined threshold value in order from a top layer.

Herein, the layer may include at least one of first to kth layers, may be implemented sequentially such that a category of an upper layer includes a category of a lower layer, and may include meta information about an immediately-upper layer and an immediately-lower layer for each layer.

Furthermore, the calculating of the prediction information may further include calculating first prediction information by learning the compression feature information input to the first layer based on the second model, inputting the first prediction information into the second layer and calculating second prediction information by learning the compression feature information and the first prediction information based on the second model, and inputting the second prediction information into the kth layer and calculating kth prediction information by learning the compression feature information, the first prediction information, and the second prediction information based on the second model.

Moreover, the calculating of the prediction result information may further include determining whether second prediction information of the second layer that is a lower layer of the first layer is not less than the threshold value, depending on the meta information when first prediction information in the first layer exceeds the predetermined threshold value, and calculating the prediction result information, based on the first prediction information of the first layer, which is an upper layer of the second layer, depending on the meta information when the second prediction information is not greater than the threshold value.

Also, the method may further include calculating of a loss for the prediction information and inputting at least one new image and learning the first model and the second model when the loss exceeds a predetermined threshold value.

Besides, different weights from one another may be sequentially assigned to the each layer. The calculating of the loss may include calculating each loss for the each layer to which the different weights are assigned.

In addition, the method may further include inputting a first new image into the learned first model and the learned second model to calculate new prediction information, calculating a new loss for the new prediction information, and terminating learning of the first model and the second model when the new loss is not greater than the predetermined threshold value.

According to an embodiment, a server recognizing and determining an object in an image includes an image obtaining unit obtaining the image, a memory, and a processor calculating a feature map including an object feature point within the image by learning the image based on a first model, calculating compression feature information by compressing the feature map based on a first filter, inputting the compression feature information for each at least one layer and calculate respective prediction information by learning the compression feature information for each layer based on a second model, and calculating prediction result information by determining whether the respective prediction information sequentially exceeds a predetermined threshold value in order from a top layer.

Herein, the layer may include at least one of first to kth layers, may be implemented sequentially such that a category of an upper layer includes a category of a lower layer, and may include meta information about an immediately-upper layer and an immediately-lower layer for each layer.

Furthermore, the processor may calculate first prediction information by learning the compression feature information input to the first layer based on the second model, may input the first prediction information into the second layer and may calculate second prediction information by learning the compression feature information and the first prediction information based on the second model, and may input the second prediction information into the kth layer and calculates kth prediction information by learning the compression feature information, the first prediction information, and the second prediction information based on the second model.

Moreover, the processor may determine whether the second prediction information of the second layer that is a lower layer of the first layer is not less than the threshold value, depending on the meta information when the first prediction information in the first layer exceeds a predetermined threshold value, may determine whether third prediction information of the third layer that is a lower layer of the second layer is not less than the threshold value, depending on the meta information when the second prediction information in the second layer exceeds the predetermined threshold value, and may calculate the prediction result information, based on the second prediction information of the second layer, which is an upper layer of the third layer, depending on the meta information when the third prediction information is not greater than the threshold value.

Also, different weights from one another may be sequentially assigned to the each layer. The processor may calculate each loss for the each layer to which the different weights are assigned.

In addition, another method for implementing the inventive concept, another system, and a computer-readable recording medium for recording a computer program for performing the method may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
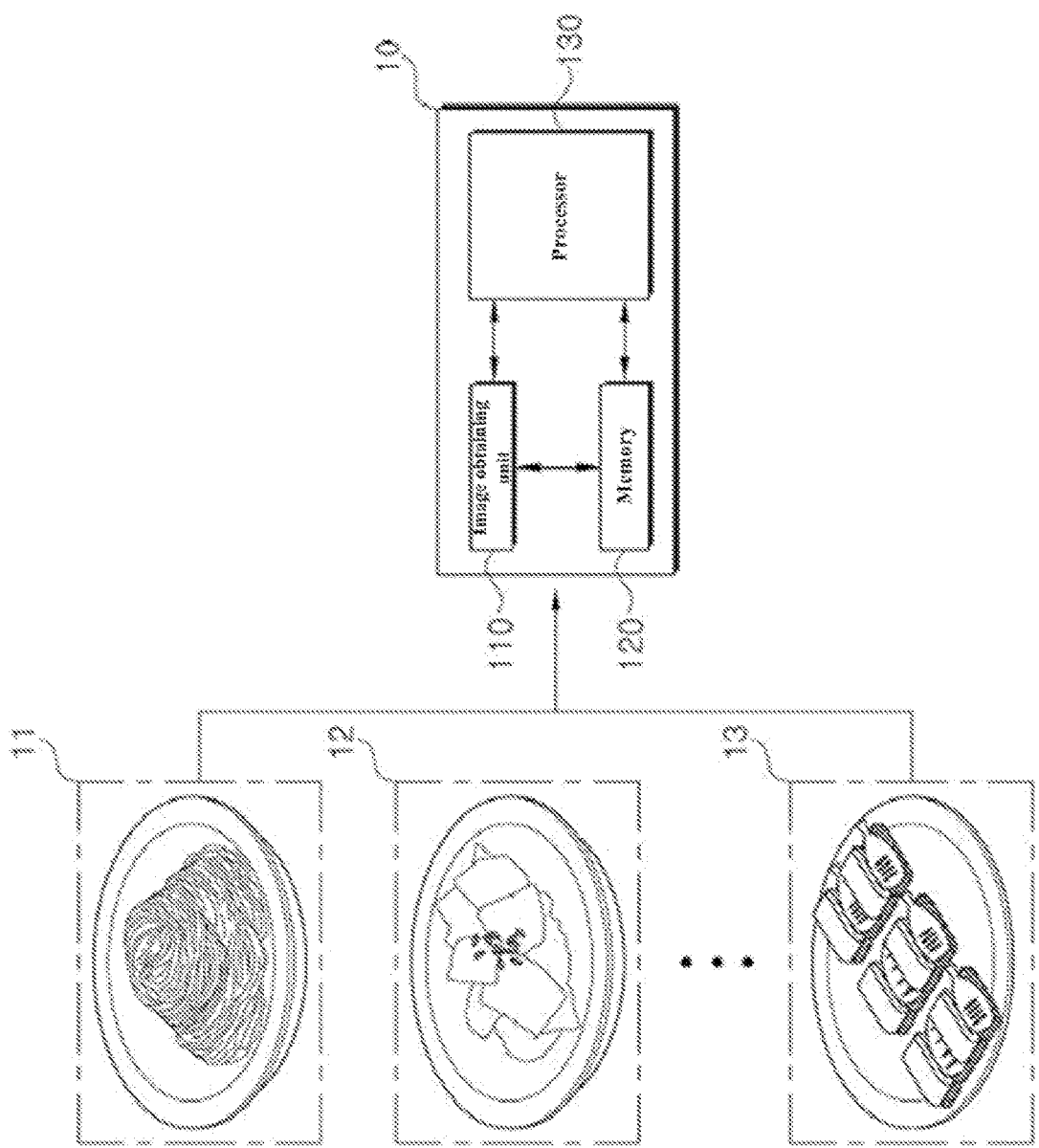
FIG. 1 is a block diagram illustrating a server for recognizing and determining an object in an image according to an embodiment of the inventive concept.

The above and other aspects, features and advantages of the inventive concept will become apparent from the following description of the following embodiments given in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the concept of the inventive concept to those skilled in the art. The inventive concept may be defined by scope of the claims.

The terminology used herein is for the purpose of describing embodiments and is not intended to limit the inventive concept. In the specification, the singular forms include plural forms unless particularly mentioned. The terms "comprises" and/or "comprising" used herein does not exclude presence or addition of one or more other elements, in addition to the aforementioned elements. The same reference numerals denote the same elements throughout the specification. As used herein, the term "and/or" includes any and all combinations of one or more of the associated components. It will be understood that, although the terms "first", "second", etc., may be used herein to describe various components, these components should not be limited by these terms. These terms are only used to distinguish one component from another component. Thus, a first component discussed below could be termed a second component without departing from the teachings of the inventive concept.

Unless otherwise defined, all terms (including technical and scientific terms) used herein have the same meaning as commonly understood by those skilled in the art to which the inventive concept pertains. The terms, such as those defined in commonly used dictionaries, should not be interpreted in an idealized or overly formal sense unless expressly so defined herein.

Hereinafter, embodiments of the inventive concept will be described in detail with reference to accompanying drawings.

Prior to a description, the meaning of terms used in the present specification will be described briefly. However, because the description of terms is used to help the understanding of this specification, it should be noted that if the inventive concept is not explicitly described as a limiting matter, it is not used in the sense of limiting the technical idea of the inventive concept.

FIG. 1 is a block diagram illustrating a server 10 for recognizing and determining an object in an image according to an embodiment of the inventive concept.

Hereinafter, according to an embodiment of the inventive concept, the server 10 that recognizes and determines an object in an image will be described with reference to FIG. 1.

The server 10 may provide a prediction result depending on a pre-stored layer for each object in the image, thereby increasing the reliability of the prediction result.

Furthermore, the server 10 may provide a method of using one network to predict an object in an image by dividing the object for each at least one layer, thereby increasing a prediction speed.

In addition, the server 10 may not be limited to K pre-stored layers for an object in an image, and may predict a plurality of objects.

Moreover, even in a case of combinations between numerous objects, which are not stored, from among objects in an image, the prediction result of the server 10 does not deviate from the structural prediction, thereby improving prediction accuracy.

The server 10 may include an image obtaining unit 110, a memory 120, and a processor 130. Herein, the server 10 may include fewer or more components than the components illustrated in FIG. 1.

The image obtaining unit 110 may obtain at least one image, at a predetermined period, in real time, or at a point in time when a user input is present. The image obtaining unit 110 may obtain the image through an external device (not illustrated), the memory 120, or the like. Here, the image may include at least one object. Referring to FIG. 1, the image may include a first image 11 obtained by capturing pasta, a second image 12 obtained by capturing "jeon", and a third image 13 obtained by capturing sushi.

The memory 120 may store information for supporting various functions of the server 10. The memory 120 may store a plurality of application programs (or applications) running in the server 10, data for an operation of the server 10, and instructions. At least part of the application programs may be downloaded from an external server (not illustrated) through wireless communication. Besides, at least part of the application programs may be present for basic functions of the server 10. In the meantime, the application program may be stored in the memory 120 and then may be driven by the processor 130 to perform an operation (or function) of the server 10.

In addition to an operation associated with the application program, the processor 130 may generally control overall operations of the server 10. The processor 130 may provide or process appropriate information or functions to a user, by processing a signal, data, information, or the like, which is input or output through the above-described components, or driving the application program stored in the memory 120.

The processor 130 may control at least part of the components described with reference to FIG. 1 to operate the application program stored in the memory 120. Furthermore, the processor 130 may combine and operate at least two or more of the components included in the server 10 to operate the application program.

The processor 130 may calculate a feature map including object feature points within the image by learning the image based on a first model.

Herein, the first model may be CNN. The CNN may be formed in a structure in which a convolution layer generating a feature map by applying a plurality of filters to each area of the image, and a pooling layer extracting features that are invariant to a change in a location or rotation by spatially integrating the feature map are repeated alternately. In this way, features of various levels from a feature of a low level such as a point, a line, a surface, or the like to a complex and meaningful feature of a high level may be extracted.

Herein, the convolution layer may obtain a feature map by applying a nonlinear activation function to an inner product of a filter and a local receptive field for each patch of an input image. As compared to other network structures, the CNN may have a feature using a filter with sparse connectivity and shared weights. This connection structure may reduce the number of parameters to be learned, and may efficiently make learning through a backpropagation algorithm, thereby improving prediction performance.

The pooling layer (or a sub-sampling Layer) may generate a new feature map by using local information of the feature map obtained from the previous convolution layer. In general, the feature map newly generated by the pooling layer is reduced to a size smaller than an original feature map. A typical integration method may include maximum pooling that selects a maximum value of the corresponding area in the feature map, average pooling that obtains an average value of the corresponding area in the feature map, and the like. In general, the feature map of the pooling layer may be less affected by an arbitrary structure or a location of pattern in an input image than the feature map of the previous layer. In other words, the pooling layer may extract a feature robust to a local change such as noise or distortion in an input image or the previous feature map. The feature is important for classification performance. For another example, the pooling layer may reflect a feature of a larger area depending on the increase in an upper learning layer in a deep structure. The pooling layer may reflect local features in a lower layer and may reflect the abstract features of the entire image depending on the increase in an upper layer while a feature extraction layer is accumulated.

As described above, the first model may be CNN, but is not limited to the CNN. For example, the first model may be formed as a neural network of various structures.

The processor 130 may calculate prediction result information about an object in an image through the prediction network provided by the inventive concept. Herein, the prediction network may include at least one layer, and may include global average pooling (GAP) as an example of a first filter and multi-layer perceptron (MLP) as an example of a second model.

The processor 130 may calculate compression feature information by compressing the feature map based on the first filter in a prediction network. Herein, the first filter may be GAP. The GAP is a known technology, and thus a detailed description thereof will be omitted.

The processor 130 may input the compression feature information for each at least one layer in the prediction network and may calculate respective prediction information by learning the compression feature information for each layer based on the second model. Herein, the second model may be MLP.

The MLP may be a neural network in which one or more middle layers are present between an input layer and an output layer, and may include a hidden layer that is a middle layer between the input layer and the output layer. The MLP has a structure similar to a structure of a single-layer perceptron. However, the MLP improves network capability by using the nonlinear input/output features of each unit and the middle layer. Here, the MLP may be implemented by using a fully connected (FC) layer and an activation function. As described above, the MLP is a known technology, and thus a detailed description thereof will be omitted.

The processor 130 may calculate prediction result information by determining whether the respective prediction information sequentially exceeds a predetermined threshold value in order from the top. The layer may include at least one of first to kth layers, may be implemented sequentially such that a category of an upper layer includes a category of a lower layer, and may include meta information about an immediately-upper layer and an immediately-lower layer for each layer.

As described above, the server 10 that recognizes and determines an object in an image has the different process and the different category of the inventive concept of the server 10 to be described through FIGS. 3 to 6 other than the same contents. Accordingly, the details will be described later with reference to FIGS. 3 to 6.

Figure 2:
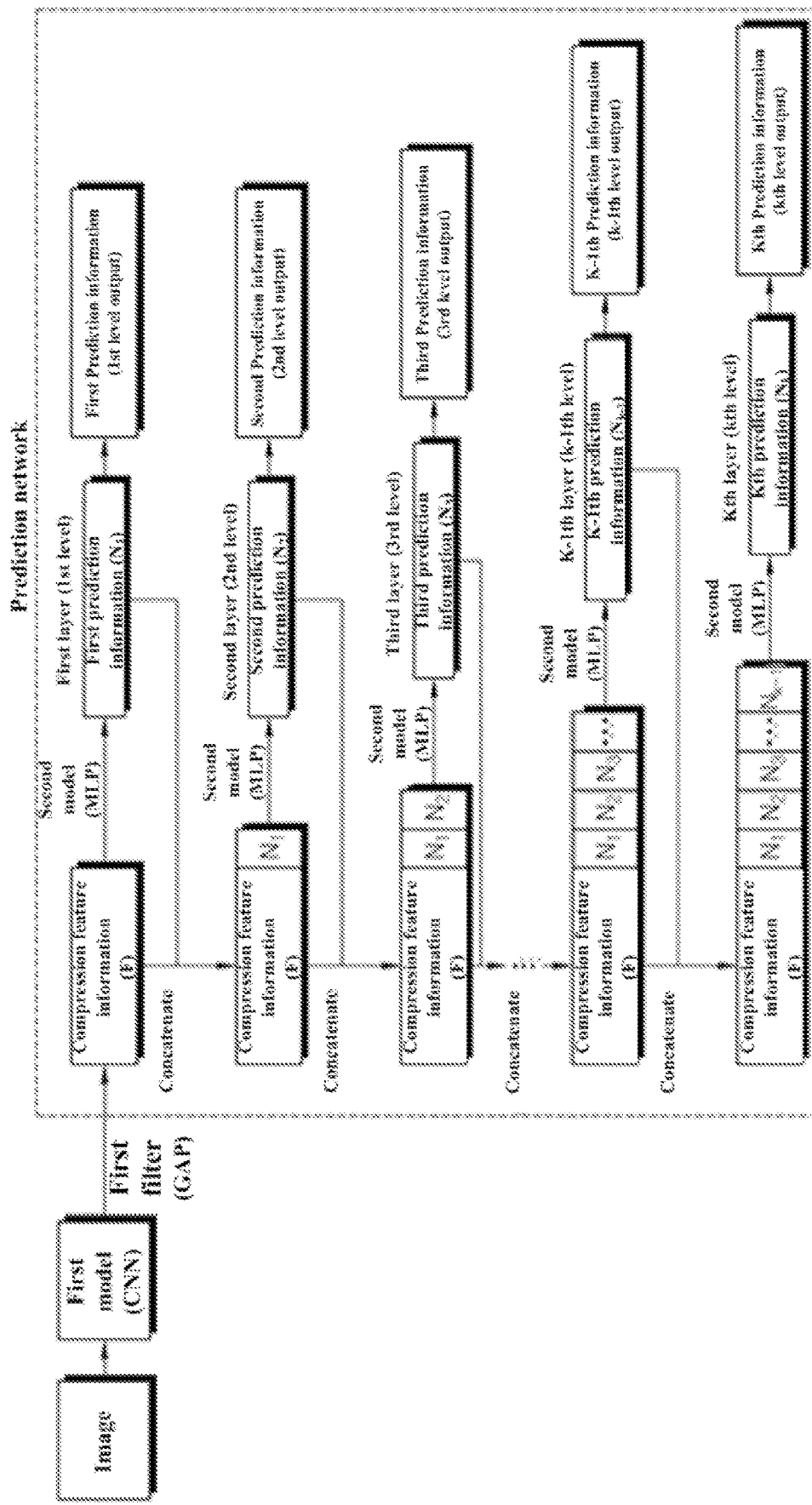
FIG. 2 is a diagram schematically illustrating a process of recognizing and determining an object in an image in a server according to an embodiment of the inventive concept.

FIG. 2 is a diagram schematically illustrating a process of recognizing and determining an object in an image in the server 10 according to an embodiment of the inventive concept.

Referring to FIG. 2, the server 10 may obtain at least one image. The server 10 may learn the obtained image based on a first model (CNN) and may calculate a feature map including object feature points within the image. The server 10 may calculate compression feature information by compressing the calculated feature map based on a first filter (GAP) in a prediction network.

The server 10 may input the calculated compression feature information to a first layer in the prediction network, and may calculate the first prediction information by learning the compression feature information based on a second model (MLP).

The server 10 may input the compression feature information and the first prediction information calculated by the first layer into a second layer that is a lower layer. The server 10 may calculate the second prediction information by learning the compression feature information and the first prediction information based on the second model.

The server 10 may input the compression feature information, the first prediction information calculated by the first layer, and the second prediction information calculated by the second layer into a third layer that is a lower layer of the second layer. The server 10 may calculate third prediction information by learning the compression feature information, the first prediction information, and the second prediction information based on the second model.

The server 10 may input the compression feature information, the first prediction information, the second prediction information, and the third prediction information into a k−1th layer that is a lower layer of the third layer. The server 10 may calculate k−1th prediction information by learning the compression feature information, the first prediction information, the second prediction information, and the third prediction information based on the second model.

The server 10 may input the compression feature information, the first prediction information, the second prediction information, the third prediction information, and the k−1th prediction information into the kth layer that is a lower layer of the k−1th layer. The server 10 may calculate kth prediction information by learning the compression feature information, the first prediction information, the second prediction information, the third prediction information, and the k−1th prediction information based on the second model.

As such, the server 10 may calculate prediction information for each layer by hierarchically stacking the compression feature information from an upper layer to a lower layer.

Figure 3:
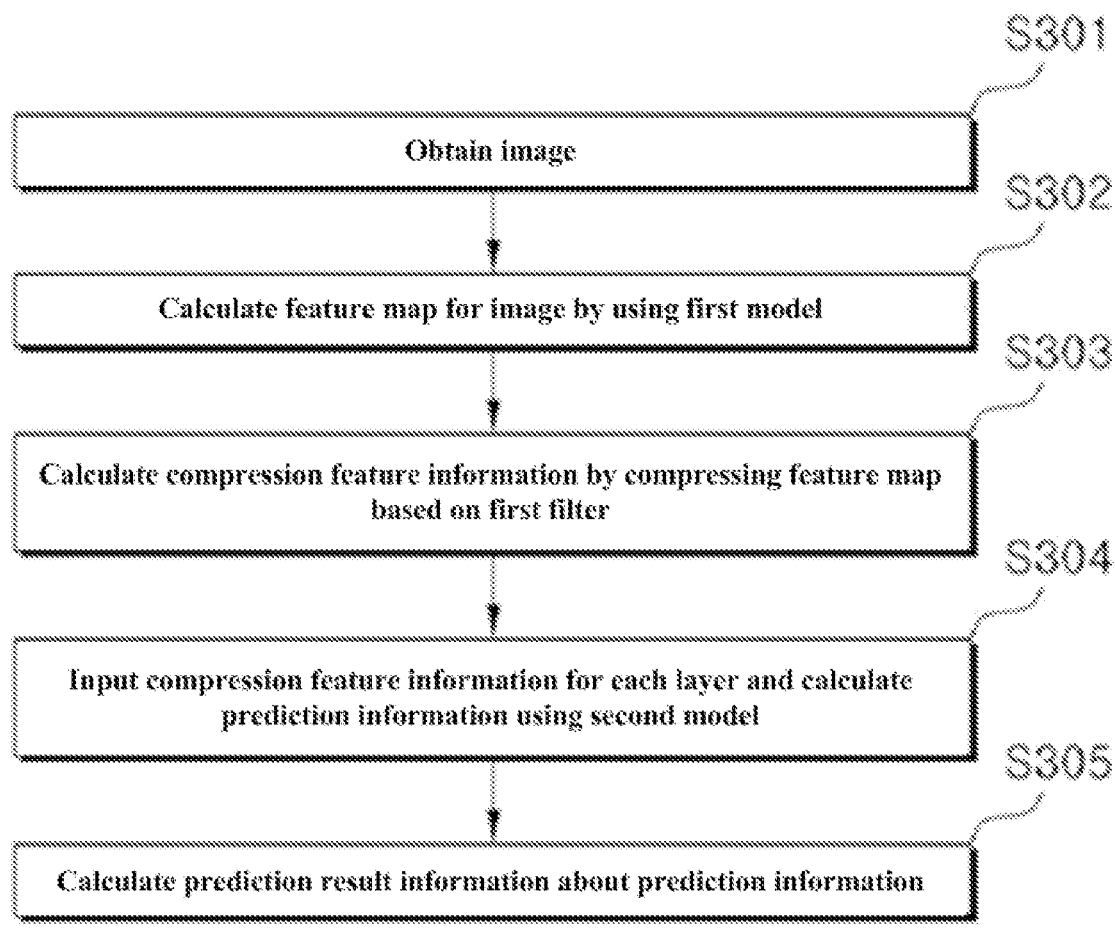
FIG. 3 is a flowchart illustrating a process of recognizing and determining an object in an image by a server according to an embodiment of the inventive concept.

FIG. 3 is a flowchart illustrating a process of recognizing and determining an object in an image by the server 10 according to an embodiment of the inventive concept.

Figure 4:
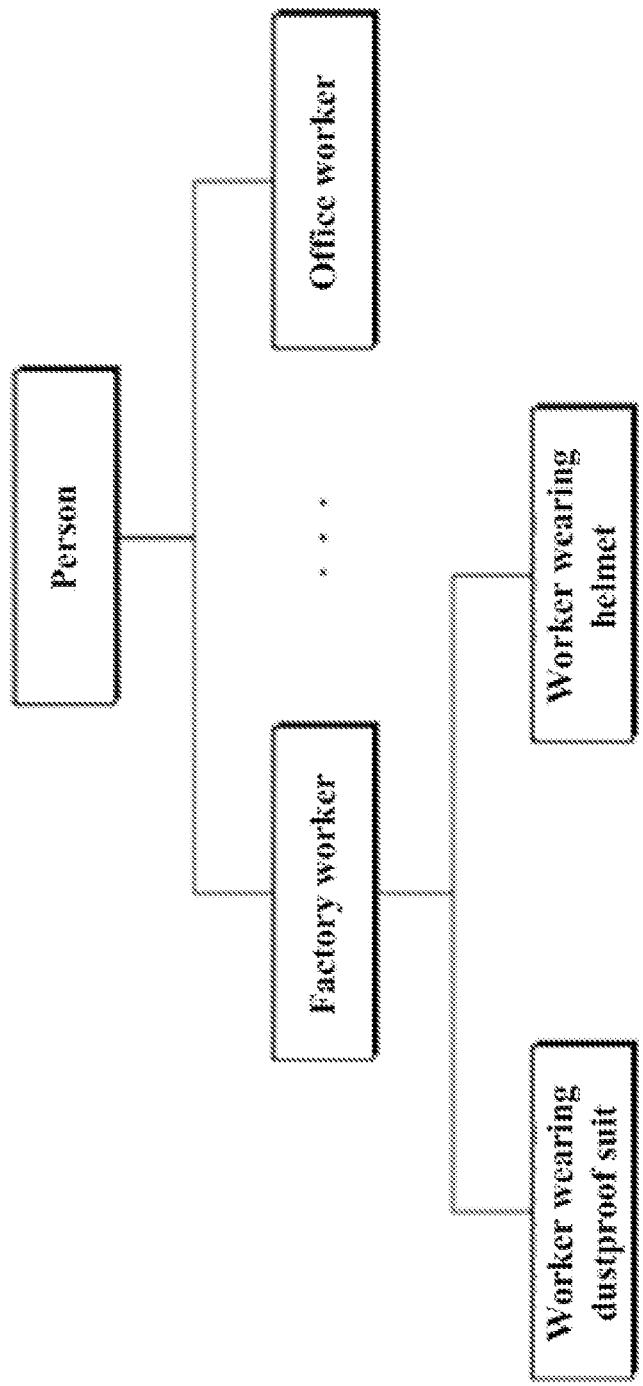
FIG. 4 is an exemplary diagram illustrating a hierarchical structure for a person's job according to an embodiment of the inventive concept.
Figure 5:
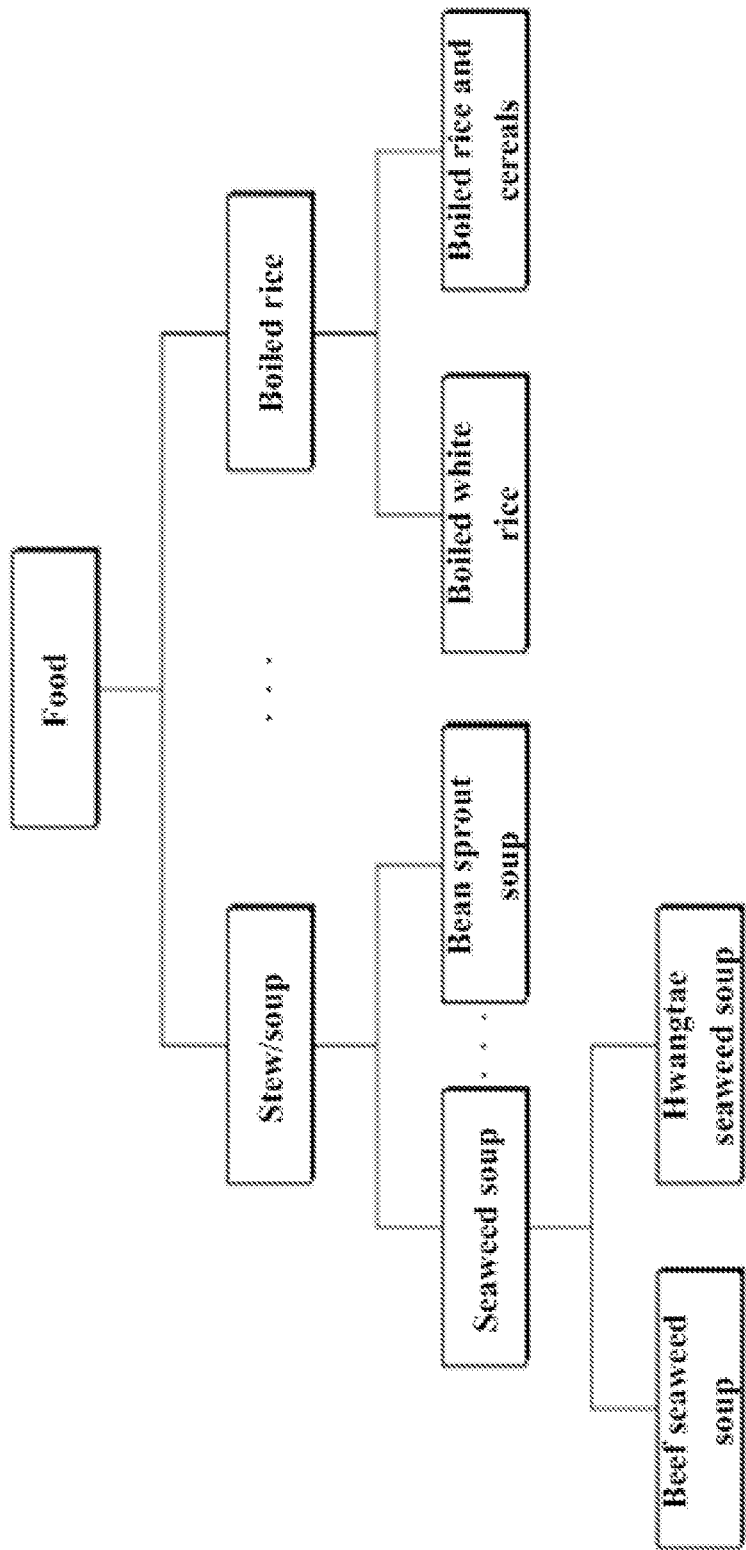
FIG. 5 is an exemplary diagram illustrating a hierarchical structure for food according to an embodiment of the inventive concept.

FIG. 4 is an exemplary diagram illustrating a hierarchical structure for a person's job according to an embodiment of the inventive concept. FIG. 5 is an exemplary diagram illustrating a hierarchical structure for food according to an embodiment of the inventive concept.

Hereinafter, a process of recognizing and determining an object in an image will be described in detail with reference to FIGS. 3 to 5. Here, an operation of the server 10 may be identically performed by the processor 130.

Referring to FIG. 3, the server 10 may obtain an image (S301).

The server 10 may obtain at least one image, at a predetermined period, in real time, or at a point in time when a user input is present. Here, the image may include at least one object.

The server 10 may calculate a feature map for the image by using the first model (S302).

The server 10 may learn the image based on a first model and then may calculate a feature map including object feature points within the image. Herein, the first model may be a state where learning is performed depending on a machine learning process of FIG. 6 to be described later.

The server 10 may calculate compression feature information by compressing the feature map based on the first filter (S303).

The server 10 may calculate the compression feature information by compressing the feature map based on GAP as an example of a first filter in a prediction network.

The server 10 may input the compression feature information for each layer and may calculate prediction information using the second model (S304).

The server 10 may input the compression feature information for each at least one layer in the prediction network, and may calculate respective prediction information by learning the compression feature information for each layer based on MLP as an example of a second model. Herein, the second model may be a state where learning is performed depending on a machine learning process of FIG. 6 to be described later.

Herein, the layer may include at least one of first to kth layers, may be implemented sequentially such that a category of an upper layer includes a category of a lower layer, and may include meta information about an immediately-upper layer and an immediately-lower layer for each layer.

Referring to FIG. 4, the structure of layer "A" for a person's job is illustrated. In FIG. 4, the structure of layer "A" may include first to third layers. The first layer may be the top layer as a 'person'. The second layer may be a 'factory worker' or an 'office worker', which are lower layers included in a category of a 'person' that is the first layer. Besides, the third layer may be a 'worker wearing a dustproof suit' and a 'worker wearing a helmet' which are lower layers included in the category of a 'factory worker' that is the second layer.

Referring to FIG. 5, the structure of layer "B" for food is illustrated. In FIG. 5, the structure of layer "B" may include first to fourth layers. The first layer may be the top layer as 'food'. The second layer may be 'stew/soup' and 'boiled rice' which are lower layers included in a category of 'food' that is the first layer.

The third layer may be 'seaweed soup' and 'bean sprout soup' which are lower layers included in the category of 'stew/soup' that is the second layer. In addition, the third layer may be 'boiled white rice' and 'boiled rice and cereals' which are lower layers included in the category of 'boiled rice' that is the second layer.

The fourth layer may be 'beef seaweed soup' and 'hwang-tae seaweed soup', which are lower layers included in the category of 'seaweed soup' that is the third layer.

The server 10 may calculate first prediction information by learning the compression feature information input to the first layer based on the second model. The server 10 may input the first prediction information into the second layer and may calculate second prediction information by learning the compression feature information and the first prediction information based on the second model. The server 10 may input the second prediction information to the kth layer and may calculate kth prediction information by learning the compression feature information, the first prediction information, and the second prediction information based on the second model.

The server 10 may calculate prediction result information about prediction information (S305).

The server 10 may calculate prediction result information by determining whether the respective prediction information sequentially exceeds a predetermined threshold value in order from the top layer.

In detail, when the first prediction information in the first layer exceeds a predetermined threshold value, the server 10 may determine whether the second prediction information of the second layer that is a lower layer of the first layer is not less than the threshold value, depending on the meta information. Herein, when the second prediction information is not greater than the threshold value, the server 10 may calculate the prediction result information, based on the first prediction information of the first layer, which is the upper layer of the second layer, depending on the meta information.

Furthermore, when the first prediction information in the first layer exceeds the predetermined threshold value, the server 10 may determine whether the second prediction information of the second layer that is a lower layer of the first layer is not less than the threshold value, depending on the meta information. When the second prediction information in the second layer exceeds the predetermined threshold value, the server 10 may determine whether the third prediction information of the third layer that is a lower layer of the second layer is not less than the threshold value, depending on the meta information. Herein, when the third prediction information is not greater than the threshold value, the server 10 may calculate the prediction result information, based on the second prediction information of the second layer, which is the upper layer of the third layer, depending on the meta information.

FIG. 3 illustrates that operation S301 to operation S305 are performed sequentially. However, this is merely illustrative of the technical idea of the inventive concept. Those skilled in the art to which an embodiment of the inventive concept belongs may apply various modifications and variations by changing and performing the order illustrated in FIG. 3 or performing one or more of operation S301 to operation S305 in parallel without departing from the essential characteristics of an embodiment of the inventive concept. The embodiment in FIG. 3 is not limited to a time-series order.

Figure 6:
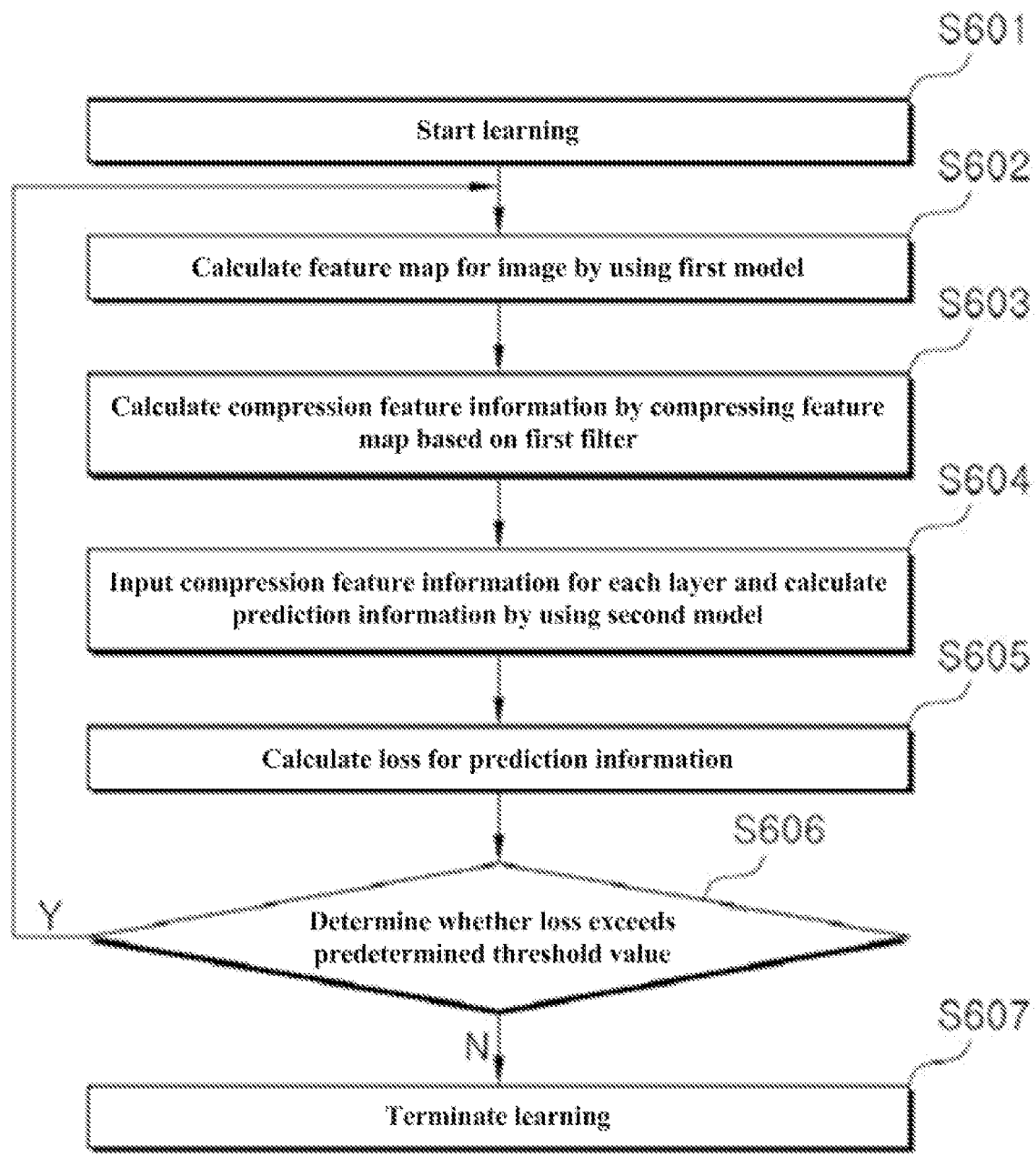
FIG. 6 is a flowchart illustrating a process of learning a first model and a second model that are used in a process of recognizing and determining an object in an image by a server according to an embodiment of the inventive concept.

FIG. 6 is a flowchart illustrating a process of learning a first model and a second model that are used in a process of recognizing and determining an object in an image by the server 10 according to an embodiment of the inventive concept.

The server 10 may start learning the first model and the second model to recognize and determine an object in an image (S601). Here, the server 10 may start learning by separating the image into in units of batches.

The server 10 may calculate a feature map for the image by using the first model (S602), may calculate compression feature information by compressing the feature map based on the first filter (S603), may input the compression feature information for each layer, and may calculate prediction information by using the second model (S604).

Because operation S602 to operation S604 are the same as operation S302 to operation S304 described with reference to FIG. 3, the detailed descriptions thereof will be omitted.

The server 10 may calculate a loss for the prediction information (S605). Herein, the server 10 may calculate a loss for each layer to which weights different from one another are assigned. Different weights may be sequentially assigned to each layer. The server 10 may calculate a loss based on Equation 1 below.

$$loss_{total} = \sum_{i=1}^{k} \alpha_i loss_i \qquad \text{[Equation 1]}$$

(Herein, loss_total may be a total loss. 'k' may be the number of layers. α may be a weight for each layer. A loss may be a loss for each layer.)

Depending on an environment in use, the server 10 may variably apply the weight or may uniformly provide the weight. Here, the server 10 may assign a weight of an upper layer (level) higher than that of a lower layer.

The server 10 may determine whether the loss exceeds a predetermined threshold value (S606). Here, in addition to determining whether the loss exceeds the predetermined threshold value, the server 10 may determine whether the scheduled learning iteration has been completed. For example, when the scheduled learning iteration has been completed, the server 10 may terminate learning. When the scheduled learning iteration is left, the server 10 may continue the learning.

In operation S606, the server 10 may perform operation S602 to operation S605 again when the loss exceeds the predetermined threshold value. The server 10 may learn the first and second models by inputting at least one new image.

In detail, the server 10 may calculate a new feature map for the new image by using the first model and may calculate new compression feature information by compressing the new feature map based on the first filter. The server 10 may input the new compression feature information for each layer, may calculate new prediction information by using the second model, and may calculate a new loss for the new prediction information. In this way, the server 10 may determine again whether the new loss exceeds a predetermined threshold value. When the new loss exceeds the predetermined threshold value, the server 10 may repeat the above-described learning process. When the new loss is not greater than the predetermined threshold value, the server 10 may terminate the learning.

When the loss is not greater than the predetermined threshold value in operation S606, the server 10 may terminate the learning (S607).

FIG. 6 illustrates that operation S601 to operation S607 are performed sequentially. However, this is merely illustrative of the technical idea of the inventive concept. Those skilled in the art to which an embodiment of the inventive concept belongs may apply various modifications and variations by changing and performing the order illustrated in FIG. 6 or performing one or more of operation S601 to operation S607 in parallel without departing from the essential characteristics of an embodiment of the inventive concept. The embodiment in FIG. 6 is not limited to a time-series order.

According to an embodiment of the inventive concept, the method described with reference to FIGS. 3 and 6 may be implemented by a program (or an application) and may be stored in a medium such that the program is executed in combination with a server being hardware.

The above-described program may include a code encoded by using a computer language such as C, C++, JAVA, a machine language, or the like, which a processor (CPU) of the computer may read through the device interface of the computer, such that the computer reads the program and performs the methods implemented with the program. The code may include a functional code related to a function that defines necessary functions that execute the method, and may include an execution procedure related control code necessary for the processor of the computer to execute the functions in its procedures. Furthermore, the code may further include a memory reference related code on which location (address) of an internal or external memory of the computer should be referenced by the media or additional information necessary for the processor of the computer to execute the functions. Moreover, when the processor of the computer needs to communicate with any other remote computer or any other remote server to perform the functions, the code may further include a communication-related code associated with how to communicate with any other remote computer or server using the communication module of the computer, what information or media should be transmitted or received during communication, or the like.

The steps of a method or algorithm described in connection with the embodiments of the inventive concept may be embodied directly in hardware, in a software module executed by hardware, or in a combination thereof. The software module may reside on a Random Access Memory (RAM), a Read Only Memory (ROM), an Erasable Programmable ROM (EPROM), an Electrically Erasable Programmable ROM (EEPROM), a Flash memory, a hard disk, a removable disk, a CD-ROM, or a computer readable recording medium in any form known in the art to which the inventive concept pertains.

Figure 7:
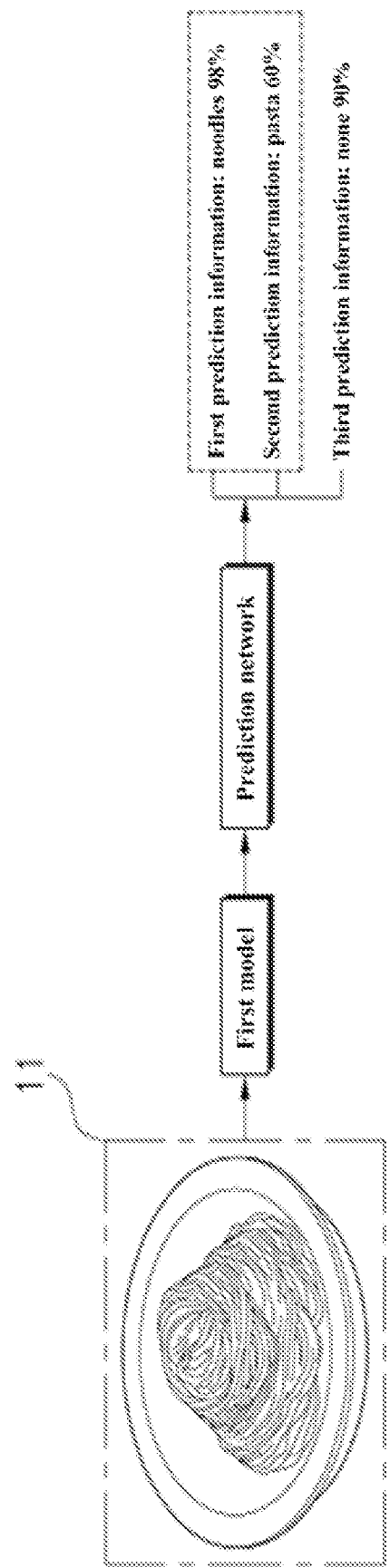
FIG. 7 is an exemplary diagram illustrating that a server determines a first image for each layer by using a prediction network, according to an embodiment of the inventive concept.

FIG. 7 is an exemplary diagram illustrating that the server 10 determines a first image for each layer by using a prediction network according to an embodiment of the inventive concept.

Referring to FIG. 7, the server 10 may obtain a first image obtained by capturing pasta. The server 10 may learn the obtained first image based on a first model and may calculate a feature map including object feature points within the first image. The server 10 may calculate compression feature information by compressing the calculated feature map based on the first filter in a prediction network.

The server 10 may input the calculated compression feature information to the first layer in the prediction network, and may calculate "noodles 98%", which are the first prediction information, by learning the compression feature information based on the second model.

The server 10 may input the compression feature information and the first prediction information into a second layer that is a lower layer. The server 10 may calculate "pasta 60%", which is the second prediction information, by learning the compression feature information and the first prediction information based on the second model.

The server 10 may input the compression feature information, the first prediction information, and the second prediction information into a third layer that is a lower layer of the second layer. The server 10 may calculate "none 90%", which is the third prediction information, by learning the compression feature information, the first prediction information, and the second prediction information based on the second model.

As a result, the server 10 may calculate the first prediction information of "noodles 98%" in the first layer, the second prediction information of "pasta 60%" in the second layer, and the third prediction information of "none 90%" in the third layer for each layer. Afterward, the server 10 may determine whether each of the first to third prediction information sequentially exceeds a predetermined threshold value in order from the top layer. In detail, the server 10 may determine whether "noodles 98%" that is the first prediction information in the first layer exceeds the predetermined threshold value. Herein, the server 10 may determine the second prediction information in the second layer that the next layer, by determining that "noodles 98%" that is the first prediction information exceeds the predetermined threshold value of 50%. The server 10 may determine whether "pasta 60%" that is the second prediction information in the second layer exceeds the predetermined threshold value. Herein, the server 10 may determine the third prediction information in the third layer that the next layer, by determining that "pasta 60%" that is the second prediction information exceeds the predetermined threshold value of 50%. Because the third prediction information in the third layer is "none 90%", the server 10 may determine that the third prediction information is useless, and may calculate that the prediction result information about the first image is 'noodles and pasta', based on "pasta 60%", which is the second prediction information in the second layer that is an immediately-upper layer, and "noodles 98%", which is the first prediction information in the first layer that is an immediately-upper layer of the second layer.

As such, the server 10 may perform prediction for each layer, and then may identify upper and lower layers in order from a lower layer based on meta data and predicted prediction information. Accordingly, the server 10 may sequentially determine whether prediction information exceeds the predetermined threshold value from a lower layer to an upper layer, and may correct prediction result information.

Figure 8:
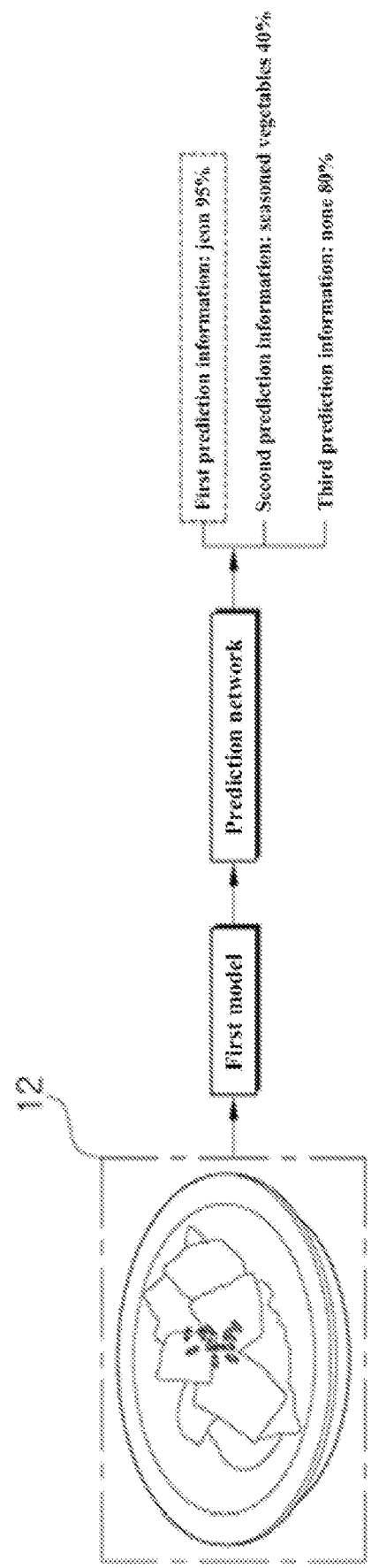
FIG. 8 is an exemplary diagram illustrating that a server determines a second image for each layer by using a prediction network, according to an embodiment of the inventive concept.

FIG. 8 is an exemplary diagram illustrating that the server 10 determines a second image for each layer by using a prediction network according to an embodiment of the inventive concept.

Referring to FIG. 8, the server 10 may obtain a second image obtained by capturing "jeon". The server 10 may learn the obtained second image based on a first model and may calculate a feature map including object feature points within the second image. The server 10 may calculate compression feature information by compressing the calculated feature map based on the first filter in a prediction network.

The server 10 may input the calculated compression feature information to the first layer in the prediction network, and may calculate "jeon 95%", which is the first prediction information, by learning the compression feature information based on the second model.

The server 10 may input the compression feature information and the first prediction information into a second layer that is a lower layer. The server 10 may calculate "seasoned vegetables 40%", which is the second prediction information, by learning the compression feature information and the first prediction information based on the second model.

The server 10 may input the compression feature information, the first prediction information, and the second prediction information into a third layer that is a lower layer of the second layer. The server 10 may calculate "none 80%", which is the third prediction information, by learning the compression feature information, the first prediction information, and the second prediction information based on the second model.

As a result, the server 10 may calculate the first prediction information of "jeon 95%" in the first layer, the second prediction information of "seasoned vegetables 40%" in the second layer, and the third prediction information of "none 80%" in the third layer for each layer. Afterward, the server 10 may determine whether each of the first to third prediction information sequentially exceeds a predetermined threshold value in order from the top layer. In detail, the server 10 may determine whether "j eon 95%" that is the first prediction information in the first layer exceeds the predetermined threshold value. Herein, the server 10 may determine the second prediction information in the second layer that the next layer, by determining that "jeon 95%" that is the first prediction information exceeds the predetermined threshold value of 50%. The server 10 may determine whether "seasoned vegetables 40%" that is the second prediction information in the second layer exceeds the predetermined threshold value. Herein, because "seasoned vegetables 40%" that is the second prediction information does not exceed the predetermined threshold value of 50%, the server 10 may not determine the third prediction information in the next layer that is the third layer, and may calculate that the prediction result information about the second image is 'jeon', based on "jeon 95%" that is the first prediction information in the first layer that is an immediately-upper layer.

As such, the server 10 may perform prediction for each layer, and then may identify upper and lower layers in order from a lower layer based on meta data and predicted prediction information. Accordingly, the server 10 may sequentially determine whether prediction information exceeds the predetermined threshold value from a lower layer to an upper layer, and may correct prediction result information.

Although embodiments of the inventive concept have been described herein with reference to accompanying drawings, it should be understood by those skilled in the art that the inventive concept may be embodied in other specific forms without departing from the spirit or essential features thereof. Therefore, the above-described embodiments are exemplary in all aspects, and should be construed not to be restrictive.

According to an embodiment of the inventive concept, it is possible to provide a prediction result depending on a pre-stored layer for each object in the image, thereby increasing reliability of the prediction result.

Furthermore, the inventive concept may provide a method of using one network to predict an object in an image by dividing the object for each at least one layer, thereby increasing a prediction speed.

Moreover, the inventive concept is not limited to K pre-stored layers for the object in an image, and may predict a plurality of objects.

Besides, the inventive concept may improve prediction accuracy even in a case of combinations between numerous objects, which are not stored, from among objects in an image, without deviating from a structural prediction.

The effects of the present inventive concept are not limited to the aforementioned effects, and other effects not mentioned herein will be clearly understood from the following description by those skilled in the art to which the inventive concept pertains.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method in which a server recognizes and determines an object in an image, the method comprising:
    calculating a feature map including an object feature point within the image by learning the image based on a first model;
    calculating compression feature information by compressing the feature map based on a first filter;
    inputting the compression feature information for each at least one layer and calculating respective prediction information by learning the compression feature information for each layer based on a second model; and
    calculating prediction result information by determining whether the respective prediction information sequentially exceeds a predetermined threshold value in order from a top layer,
    wherein the layer includes at least one of first to kth layers, is implemented sequentially such that a category of an upper layer includes a category of a lower layer, and includes meta information about an immediately-upper layer and an immediately-lower layer for the each layer.

2. The method of claim 1, wherein the calculating of the prediction information further includes:
    calculating first prediction information by learning the compression feature information input to the first layer based on the second model;
    inputting the first prediction information into the second layer and calculating second prediction information by learning the compression feature information and the first prediction information based on the second model; and
    inputting the second prediction information into the kth layer and calculating kth prediction information by learning the compression feature information, the first prediction information, and the second prediction information based on the second model.

3. The method of claim 1, wherein the calculating of the prediction result information further includes:
    when first prediction information in the first layer exceeds the predetermined threshold value, determining whether second prediction information of the second layer that is a lower layer of the first layer is not less than the threshold value, depending on the meta information; and
    when the second prediction information is not greater than the threshold value, calculating the prediction result information, based on the first prediction information of the first layer, which is an upper layer of the second layer, depending on the meta information.

4. The method of claim 1, further comprising:
    calculating of a loss for the prediction information; and
    when the loss exceeds a predetermined threshold value, inputting at least one new image and learning the first model and the second model.

5. The method of claim 4, wherein different weights from one another are sequentially assigned to the each layer, and wherein the calculating of the loss includes:
    calculating each loss for the each layer to which the different weights are assigned.

6. The method of claim 4, further comprising:
inputting a first new image into the learned first model and the learned second model to calculate new prediction information;
calculating a new loss for the new prediction information; and
when the new loss is not greater than the predetermined threshold value, terminating learning of the first model and the second model.

7. A program that is stored on a non-transitory computer-readable medium to execute a method of claim 1 in combination with a computer that is a piece of hardware.

8. A server recognizing and determining an object in an image, the server comprising:
an image obtaining unit configured to obtain the image;
a memory; and
a processor is configured to:
calculate a feature map including an object feature point within the image by learning the image based on a first model;
calculate compression feature information by compressing the feature map based on a first filter;
input the compression feature information for each at least one layer and calculate respective prediction information by learning the compression feature information for each layer based on a second model; and
calculate prediction result information by determining whether the respective prediction information sequentially exceeds a predetermined threshold value in order from a top layer,
wherein the layer includes at least one of first to kth layers, is implemented sequentially such that a category of an upper layer includes a category of a lower layer, and includes meta information about an immediately-upper layer and an immediately-lower layer for the each layer.

9. The server of claim 8, wherein the processor calculates first prediction information by learning the compression feature information input to the first layer based on the second model, inputs the first prediction information into the second layer and calculates second prediction information by learning the compression feature information and the first prediction information based on the second model, and inputs the second prediction information into the kth layer and calculates kth prediction information by learning the compression feature information, the first prediction information, and the second prediction information based on the second model.

10. The server of claim 9, wherein the processor determines whether the second prediction information of the second layer that is a lower layer of the first layer is not less than the threshold value, depending on the meta information when the first prediction information in the first layer exceeds a predetermined threshold value, determines whether third prediction information of the third layer that is a lower layer of the second layer is not less than the threshold value, depending on the meta information when the second prediction information in the second layer exceeds the predetermined threshold value, and calculates the prediction result information, based on the second prediction information of the second layer, which is an upper layer of the third layer, depending on the meta information when the third prediction information is not greater than the threshold value.

11. The server of claim 8, wherein the processor calculates a loss for the prediction information and inputs at least one new image and learns the first model and the second model when the loss exceeds a predetermined threshold value.

12. The server of claim 11, wherein different weights from one another are sequentially assigned to the each layer, and wherein the processor calculates each loss for the each layer to which the different weights are assigned.

13. The server of claim 11, wherein the processor inputs a first new image into the learned first model and the learned second model to calculate new prediction information, calculates a new loss for the new prediction information, and terminates learning of the first model and the second model when the new loss is not greater than the predetermined threshold value.

* * * * *